Aug. 26, 1958 J. LOXHAM 2,848,889
PNEUMATIC GAUGES
Filed Jan. 18, 1956 3 Sheets-Sheet 1

Aug. 26, 1958                J. LOXHAM                2,848,889
                          PNEUMATIC GAUGES
Filed Jan. 18, 1956                              3 Sheets-Sheet 2
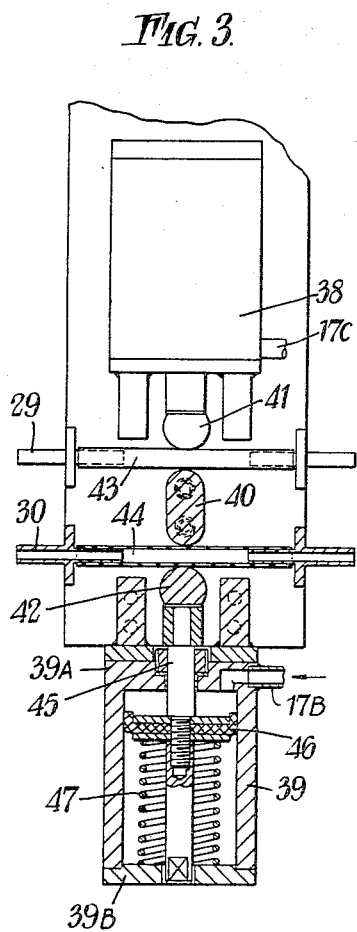
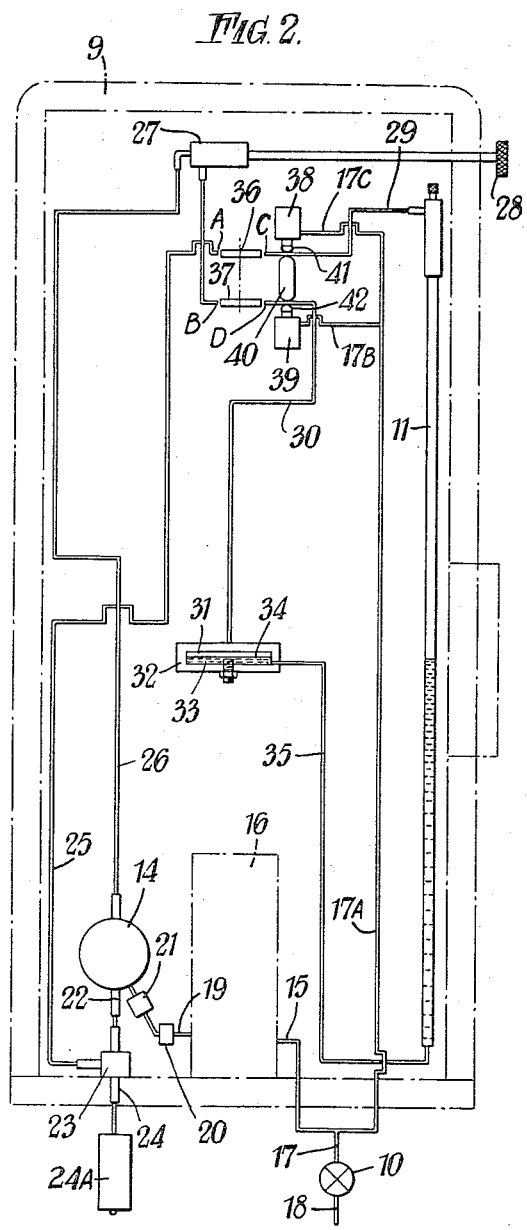

United States Patent Office 2,848,889
Patented Aug. 26, 1958

2,848,889

PNEUMATIC GAUGES

John Loxham, Letchworth, England, assignor to The Sigma Instrument Company Limited, Letchworth, England, a British company Application January 18, 1956, Serial No. 559,893

4 Claims. (Cl. 73—37.5)

This invention relates to pneumatic gauges.

According to the present invention there is provided a pneumatic gauge comprising a pneumatic measuring head connected to be fed with air through a control orifice, from a source of air under pressure, a tube containing liquid and having one end connected to the downstream side of said orifice so that variations in the flow of air from the head alter the level of the liquid in the tube in accordance with the dimension of a workpiece being gauged by the head, and a first valve in the connection between the tube and the downstream side of the orifice, the valve being arranged to be open during gauging and to close after the workpiece has been gauged so that the level of the liquid in the tube is maintained at the level indicative of the gauged dimension, after the workpiece has been removed from the gauging position.

For a better understanding of the invention and to show how the same may be carried into effect, reference will now be made to the accompanying drawings, in which:

Figure 2 is a circuit diagram of one of the pneumatic gauges employed in the machine of Figure 1, Figure 3 is, to an enlarged scale, a part sectional elevation of a detail of the circuit of Figure 2.

Figure 1:
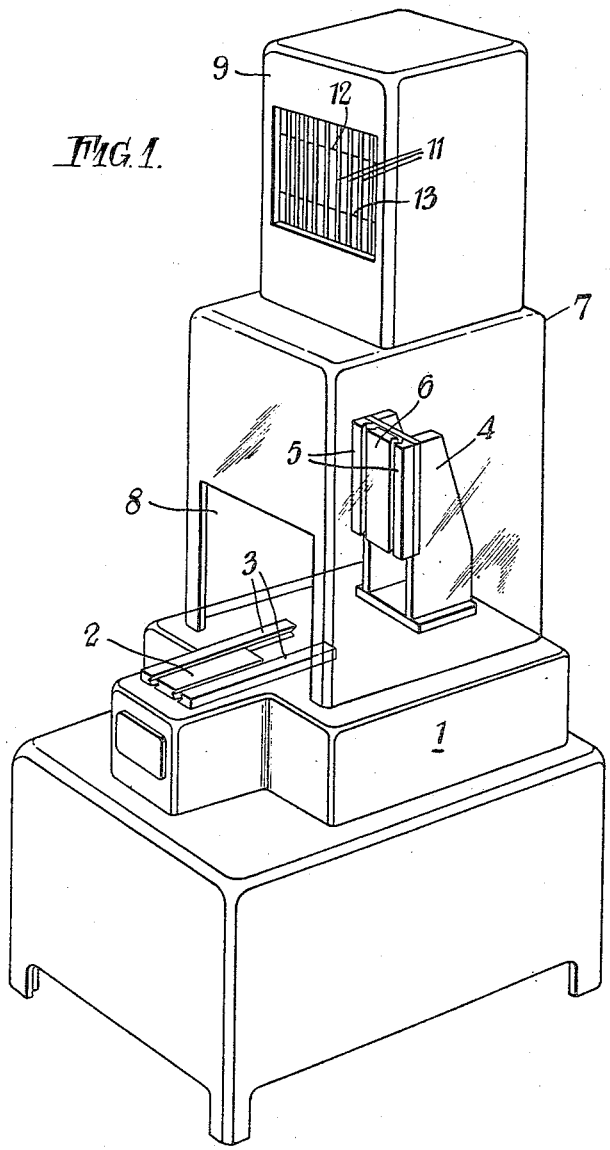
Figure 1 is a perspective view of an inspection machine, from which the work holder and gauging heads have been removed for the sake of clarity.
Figure 4:
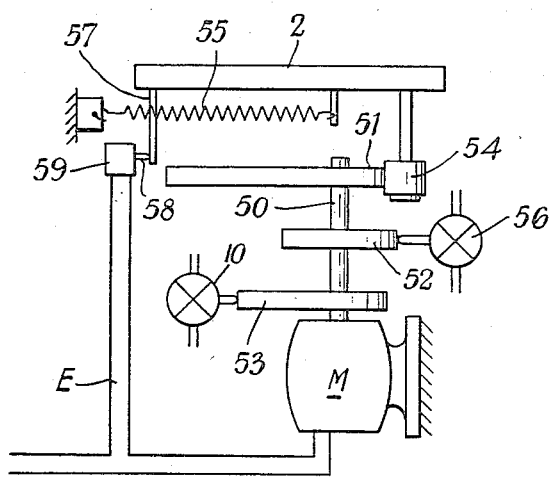
Figure 4 is a diagrammatic elevation of driving mechanism contained in the base of the machine of Figure 1.

The inspection machine is of the multidimension kind, that is to say, the machine inspects simultaneously a number of dimensions of a workpiece submitted to the machine. The machine has a hollow base unit 1 carrying a horizontal slide 2 in guides 3 on top of the unit 1. The guides 3 are arranged so that the slide 2 can be moved horizontally from front to rear of the unit 1 and vice versa. The slide 2 carries a work holder (not shown) appropriate for the workpiece to be inspected. A pillar 4 extends upwardly from the back of the unit 1, the pillar having guides 5 for a slide 6 that can be moved vertically of the pillar 4. The pillar 4 is enclosed by a transparent cover 7 supported by the unit 1 and having an opening 8. An indicator unit 9 is mounted at the top of the cover 7. Several gauge heads (not shown), each having a movable gauging anvil, are carried by the slide 6. Gauging heads may also be carried by the slide 2. The locations at which the heads are positioned will, of course, be determined by the nature of the workpiece and the dimensions thereof that it is desired to gauge.

The base unit 1 contains an electric motor M that drives a cam shaft 50 having disc-like cams 51, 52 and 53. The cam 51 drives the slide 2 horizontally through the intermediary of a follower 54 carried on the under side of the slide 2. The follower 54 is maintained in contact with the cam 51 by a spring 55. The cam 52 operates a valve 56 controlling a pneumatic ram (not shown) that reciprocates the slide 6 up and down. The cam 53 operates a valve 10. An arm 57 depending from the slide 2 cooperates with the operating member 58 of a delay switch 59 connected in the electric supply lines E leading to the motor M.

The general operation of the machine is that a workpiece is submitted to the work holder on the slide 2 when the latter is at its loading station, i. e. adjacent the front of the base unit 1. The slide 2 with the work holder is then moved through the opening 8 to a measuring position near the rear of the base unit 1 and the slide 6 subsequently is moved downwardly to present the gauging anvils carried thereby, to the workpiece to be gauged. The result of gauging is shown by said indicator unit 9.

The gauging anvils each form part of a pneumatic measuring head as described in British patent specification No. 724,228, each head being connected to a pneumatic gauge as described in British patent specification No. 724,205. The glass tubes 11 associated one with each gauging anvil are mounted side-by-side on the front of the indicator unit 9. The tubes 11 contain coloured liquid and are disposed in front of a white background so that the level of the liquid can easily be observed. Two spaced horizontal lines 12, 13 one above the other are ruled on the background.

The pneumatic apparatus associated with the several gauging anvils are all supplied from a single manifold 14 (Figure 2). The inlet 15 of a pressure regulator 16 as described in British patent specification No. 723,793 is connected to the outlet 17 of the valve 10, the inlet 18 of which is connected to a source (not shown) of high pressure (90 lbs. per square inch) compressed air. The outlet 19 of the regulator is connected through two filters 20, 21 arranged in series with each other, to said manifold 14. The regulator 16 reduces the air pressure to about 8 lbs. per square inch on the outlet side thereof.

Each pneumatic gauge has a connection 22 leading from the manifold 14 through an element 23 having a control orifice, to a connection 24 that leads to an associated pneumatic measuring head 24A. A line 25 leads from the downstream side of the orifice to a connection point A. A line 26 leads from the manifold 14 through a control orifice and an adjustable valve unit 27 to a point B. The valve of the unit 27 permits an adjustable leakage of air to atmosphere, adjustment of the valve being effected by a knob 28. A pipe 29 leads from a point C to the top of the associated tube 11 and a pipe 30 leads from a point D to an upper compartment 31 of a flat box 32 that is divided into upper and lower compartments 31 and 33 by a horizontally disposed flexible diaphragm 34. The lower compartment 33 is connected by a pipe 35 to the lower end of the associated tube 11. The lower part of the tube 11, the pipe 35 and the compartment 33 are filled with coloured liquid. Connecting means 36 and 37 are provided for connecting the points A and B to C and D. When the point A is connected to the point C, the point B is connected to the point D.

The outlet 17 of the valve 10 also leads via points 17A, 17B and 17C to two cylinders 38, 39. The pipes 29 leading to the tops of the several glass tubes 11 each pass between a fixed bar 40 and a movable bar 41. The pipes 30 leading to the upper chambers 31 pass between a movable bar 42 and the fixed bar 40. At locations adjacent the bars 40—42 the pipes 29 and 30 have sections 43, 44 respectively that are of flexible material such as rubber. The movable bar 42 is parallel to the fixed bar 40 and is secured at its centre to one end of a piston rod 45. The piston rod 45 is at right-angles to the bar 42 and is passed through the end 39A of the cylinder 39 that has therein a piston 46 secured on the rod 45. A spring 47 is located between the piston 46 and the opposite end 39B of the cylinder 39 for urging the movable bar 42 towards the fixed bar 40 thereby to squeeze the flexible sections 44 that pass between the two bars.

The movable bar 41 is arranged similarly to the movable bar 42 and has a similar piston and cylinder assembly for causing the bar 42 to move towards the fixed bar 41 to squeeze the flexible sections 43 that pass between the two bars.

The machine described above is used as follows. A master workpiece is submitted to a work holder on the slide 2 when the latter is at the loading station and slide 2 with the workpiece is then moved to the measuring or gauging position. When in the measuring position the slide 6 is in its lowest position, the various gauging anvils (not shown) carried by the slide 6 encounter the master workpiece and the valve 10 is opened. When the valve 10 is opened high pressure air is fed to the cylinders 38, 39 and the pistons therein are displaced against the action of the springs 47 and cause the movable bars 41, 42 to move away from the fixed bar 40 so that flow through the flexible sections 43, 44 can take place. The various pneumatic apparatus are then adjusted by operation of the knobs 28 so that the liquid levels are mid-way between the two lines 12, 13 (assuming the positive and negative tolerances of the dimensions of the workpiece are equal). The electric motor M is then operated to cause the valve 10 to be closed, the slide 6 to be moved upwardly and the slide 2 to be moved from the measuring position to the loading station. The machine is then set for continuous running and a workpiece to be gauged is submitted to the work holder on the slide 2 whilst the latter is at the loading station. At the end of a predetermined period (determined by the delay switch 59) for which the slide 2 remains at the loading station, the electric motor M is set in operation and the work holder is moved towards the measuring position. When the work holder has reached the measuring position, the slide 6 is caused by operation of the valve 56 to move from its upper position to its lower position. Subsequently the valve 10 is opened by the cam 53. Opening of the valve 10 causes immediate release of the flexible sections 43, 44 so that air can flow therethrough, and also causes air to flow through the regulator 16 to the pneumatic gauging apparatus. At this stage the various gauging anvils are in contact with the workpiece and if there is any displacement of the gauging anvils from the position in which they were in when the master workpiece was in the measuring position the extent of such displacement will be indicated by a proportional and magnified displacement of the level of the liquid in the associated glass tube 11. (The manner in which this comes about is explained in detail in British patent specification No. 724,205.) If the liquid level moves above or below either the upper or the lower horizontal lines 12, 13 on said background, the workpiece is outside the permitted tolerance in regard to the dimension with which the liquid level is associated. Continued operation of the motor M causes the valve 10 to close whereupon the springs 47 in the cylinders 38, 39 immediately re-assert themselves and the flexible sections 43, 44 are gripped to prevent flow of air therethrough whereby the liquid levels in the glass tubes 11 are maintained at the position that they were in before the valve 10 was shut. After the valve 10 is shut the slide 6 is caused to move upwardly. The work holder on the slide 2 is then retracted from the measuring position. Immediately before reaching the loading station, the delay switch 59 is operated and then the motor M is switched off for a predetermined period of time whilst the gauged workpiece is removed by the operator and replaced by a further workpiece that requires gauging. The valve 10 remains closed until the next workpiece is gauged and hence it will be understood that the result of the gauging of a workpiece remains on the indicator unit 9 until the next workpiece is gauged.

I claim:

1. A pneumatic gauge for checking a dimension of a workpiece, the gauge comprising a source of air under pressure, a pneumatic measuring head for co-operating with the workpiece, a first conduit for feeding air from the source to said head, there being a control orifice in said conduit, a transparent tube, liquid in the tube, a second conduit leading from that portion of the first conduit that is on the downstream side of the orifice to one end of said tube, a first valve in said second conduit, a member for supporting the workpiece, timing means for moving said member cyclically from a loading position where the workpiece is placed on said member to a gauging position where the workpiece is presented to the pneumatic measuring head, and a connection from the timing means to said first valve to cause the latter to be opened and closed by the timing means during gauging of the workpiece whereby the level of liquid in the tube is maintained at the level indicative of the gauged dimension after the workpiece has been removed from co-operation with the pneumatic measuring head.

2. A gauge as set forth in claim 1, wherein said connection includes means for cutting off the supply of air to said control orifice after gauging has taken place.

3. A gauge as set forth in claim 1 and further comprising a third conduit leading from that portion of the first conduit that is on the upstream side of the control orifice, to the other end of said tube, there being a further control orifice in said third conduit and a leak-off valve in said third conduit, the leak-off valve being between the further control orifice and said other end of said tube, the leak-off valve permitting an adjustable leakage of air to atmoshpere, a second valve in said third conduit, and means connecting the first and second valves to cause the second valve to operate in synchronism with the first valve whereby the two valves open and close at the same time.

4. A gauge as set forth in claim 3, wherein said connection includes pneumatic ram means for operating the first and second valves, and a third valve driven by the timing means and controlling the supply of air to the pneumatic ram means and to the first conduit.

References Cited in the file of this patent

UNITED STATES PATENTS

| 1,462,109 | Hopkins | July 17, 1923 |
| 2,620,656 | Peterson | Dec. 9, 1952 |
| 2,647,456 | Aller et al. | Aug. 4, 1953 |
| 2,665,579 | Fortier | Jan. 12, 1954 |
| 2,691,297 | Kreisel et al. | Oct. 12, 1954 |

FOREIGN PATENTS

| 1,082,720 | France | June 23, 1954 |